US010581614B2

(12) United States Patent
Abt, Jr. et al.

(10) Patent No.: US 10,581,614 B2
(45) Date of Patent: *Mar. 3, 2020

(54) DETERMINISTIC VERIFICATION OF DIGITAL IDENTITY DOCUMENTS (71) Applicant: International Business Machines Corporation, Armonk, NY (US)

(72) Inventors: William F. Abt, Jr., Nashua, NH (US); Robert W. Harris, Jr., Austin, TX (US); Asher C. Johnson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/170,527

(22) Filed: Oct. 25, 2018

(65) Prior Publication Data
US 2019/0068378 A1 Feb. 28, 2019

Related U.S. Application Data (63) Continuation of application No. 15/218,522, filed on Jul. 25, 2016, now Pat. No. 10,225,088.

(51) Int. Cl.
*G06F 21/00* (2013.01)
*H04L 9/32* (2006.01)
(Continued)

(52) U.S. Cl.
CPC ........... *H04L 9/3247* (2013.01); *G06F 21/30* (2013.01); *G06F 21/31* (2013.01); *H04L 9/0894* (2013.01); *H04L 9/3226* (2013.01); *H04W 12/06* (2013.01)

(58) Field of Classification Search
CPC .... H04L 9/3247; H04L 9/3226; H04L 9/0894; G06F 21/30; G06F 21/31; H04W 12/06
See application file for complete search history.

(56) References Cited

U.S. PATENT DOCUMENTS 7,475,335 B2 * 1/2009 Krishna .............. G06K 9/2054
715/229
7,983,452 B2 7/2011 Chaney et al.
(Continued)

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.
(Continued)

*Primary Examiner* — Kendall Dolly
(74) *Attorney, Agent, or Firm* — Heslin Rothenberg Farley & Mesiti P.C.; Christopher Pignato, Esq.

(57) ABSTRACT

A method, computer program product, and system obtaining and identity verification request that include a specification for one or more electronic identity documents including one or more requested document types to fulfill the identity verification request. One or more processors locate at least one electronic identity document including each of the requested document types. Each electronic identity document in the repository includes machine readable metadata that includes the document type of that document. The one or more processors perform a deterministic match to select one electronic identity document including each of the one or more requested document types to utilize in formulating a response to the identity verification request and formulate a response to the identity verification request, based on the selected electronic identity document(s).

20 Claims, 6 Drawing Sheets

(51) Int. Cl.
*G06F 21/31* (2013.01)
*G06F 21/30* (2013.01)
*H04L 9/08* (2006.01)
*H04W 12/06* (2009.01)

(56) References Cited

U.S. PATENT DOCUMENTS

| | | |
|---|---|---|
| 8,540,158 B2 | 9/2013 | Lei et al. |
| 2007/0220614 A1* | 9/2007 | Ellis .................... G06F 21/6245 726/27 |
| 2012/0199653 A1* | 8/2012 | Wenzel .............. G07C 9/00087 235/382 |
| 2016/0294831 A1 | 10/2016 | Borunda et al. |
| 2016/0308855 A1* | 10/2016 | Lacey .................. G06Q 50/265 |
| 2018/0026793 A1 | 1/2018 | Abt, Jr. et al. |
| 2018/0060681 A1 | 3/2018 | Bud |
| 2018/0198787 A1 | 7/2018 | Rothschild |
| 2018/0234433 A1 | 8/2018 | Oberhauser et al. |

OTHER PUBLICATIONS

List of IBM Patents or Patent Applications Treated as Related, Oct. 25, 2018, 2 pages.

\* cited by examiner

DETERMINISTIC VERIFICATION OF DIGITAL IDENTITY DOCUMENTS

BACKGROUND

Documents that evidence the identity of the presenter are essential to many common transactions and interaction. Carrying proof of identity and proof of privilege documents (e.g., driver's license, fishing license, and membership cards) can be burdensome, so the industry is exploring the digital space. Given that different types of identification are appropriate and/or acceptable in different situations, whether digital or physical, managing all the different types of identification, guarding one's privacy by only presenting the necessary identification without extraneous personal information, as well as tracking when to present certain identification, becomes burdensome both for those presenting and evaluating credentials.

SUMMARY

Shortcomings of the prior art are overcome and additional advantages are provided through the provision of a computer program product for evaluating and responding to a verification request. The computer program product comprises a storage medium readable by a processing circuit and storing instructions for execution by the processing circuit for performing a method. The method includes, for instance: obtaining, by one or more processors, an identity verification request, wherein the identity verification request comprises a specification for one or more electronic identity documents comprising one or more requested document types to fulfill the identity verification request; based on the obtaining, searching, by the one or more processors, a repository of electronic identity documents to locate at least one electronic identity document comprising each of the one or more requested document types, wherein each electronic identity document in the repository comprises machine readable metadata comprising an respective document type; based on locating the at least one electronic identity document comprising each of the one or more requested document types, performing, by the one or more processors, a deterministic match to select one electronic identity document comprising each of the one or more requested document types to utilize in formulating a response to the identity verification request; and formulating, by the one or more processors, a response to the identity verification request, based on the selected electronic identity documents.

Shortcomings of the prior art are overcome and additional advantages are provided through the provision of a method of evaluating and responding to a verification request. The method includes, for instance: obtaining, by one or more processors, an identity verification request, wherein the identity verification request comprises a specification for one or more electronic identity documents comprising one or more requested document types to fulfill the identity verification request; based on the obtaining, searching, by the one or more processors, a repository of electronic identity documents to locate at least one electronic identity document comprising each of the one or more requested document types, wherein each electronic identity document in the repository comprises machine readable metadata comprising an respective document type; based on locating the at least one electronic identity document comprising each of the one or more requested document types, performing, by the one or more processors, a deterministic match to select one electronic identity document comprising each of the one or more requested document types to utilize in formulating a response to the identity verification request; and formulating, by the one or more processors, a response to the identity verification request, based on the selected electronic identity documents.

Shortcomings of the prior art are overcome and additional advantages are provided through the provision of a system for evaluating and responding to a verification request. The system comprises a memory, a processor in communication with the memory, and program instructions executable by the processor via the memory to perform a method. The method includes, for instance: obtaining, by one or more processors, an identity verification request, wherein the identity verification request comprises a specification for one or more electronic identity documents comprising one or more requested document types to fulfill the identity verification request; based on the obtaining, searching, by the one or more processors, a repository of electronic identity documents to locate at least one electronic identity document comprising each of the one or more requested document types, wherein each electronic identity document in the repository comprises machine readable metadata comprising an respective document type; based on locating the at least one electronic identity document comprising each of the one or more requested document types, performing, by the one or more processors, a deterministic match to select one electronic identity document comprising each of the one or more requested document types to utilize in formulating a response to the identity verification request; and formulating, by the one or more processors, a response to the identity verification request, based on the selected electronic identity documents.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code.

The industry for Identity Documents (e.g., driver's licenses, recreational licenses, membership cards, etc.) is going digital. This digitalization of these proof of identity (and proof of privilege, in the case of membership) documents presents new challenges to individuals and entities who must verify the identity of an individual providing these documents, including locating the correct card to satisfy a given verification challenge.

Other challenges exist in the realm of verification challenges related to correctly supplying a document that will satisfy a verification challenge. For example, an out-of-state license alone may not satisfy certain verification challenges, such as those related to an individual attempting to buy age-dependent products. However, in the case of the purchase attempt, the request could have been fulfilled with an out-of-state license in addition to additional forms of identification, which the individual has available digitally, but is unaware of which forms of identification would satisfy the request. Also, because the individual may possess multiple forms of digital identification, including, but not limited to, a wholesale club membership card, a university student identification card, a NH Fishing License, a North Carolina (NC) Vessel License, a political advocacy group membership card, a medical insurance card, and/or a property insurance card, the driver is at a loss regarding which digital document to provide to meet the requirements of the specific challenge.

Beyond providing a document that meets the requirements of a specific identity challenge, there are also privacy concerns that pervade, especially when so much personal information is readily available and only a small subset is required, and, depending on the age of the driver (or other individual proving his or her identity), legally obtainable. For example, a given merchant may require a driver's license for a given transaction but does not need all the attributes, since that would provide privacy information not needed apart from, depending on the product being purchased, information that the buyer is over a given age and that the buyer resembles the photograph on the license.

Additional complications in presenting and verifying identification may also occur when an institution requires more than one form of identification. For example, a pharmacy may require a driver's license, and insurance card, and possibly a further form of identification (e.g., a medical insurance card) by law. Time is wasted when an individual must fumbled through all of his or hers digital cards to fill a request to an authority, including checking which cards to send or show.

There is a need to programmatically streamline, in an intelligent manner, the verification of digital documents, in a manner that is compatible with the process of the creating these digital documents. There is also a need for a digital identification verification system that support deterministic match capabilities. Certain embodiments of the present invention address both of these challenges.

An advantage of certain embodiments of the present invention in that it provides a verification of the identity of an individual. By allowing a flexible and electronic verification of identification, embodiments of the present invention improve existing computer technology by addressing information privacy concerns while enabling a more efficient verification process, therefore improving the functionality of computing systems, even in environments that require heightened security.

Some embodiments of the present invention may include one, or more, of the following features, characteristics, operations and/or advantages: (i) an electronic identity document that is characterized by a "type" (e.g., driver's license, fishing license, membership card, insurance card, rewards card, social security card, police badge, card for food assistance, library card, gym membership, etc.), where the electronic identity document file includes machine readable metadata indicating the "type" of electronic identity document); (ii) a matching mechanism that uses the type metadata of the document to determine which among a set of owner's documents should be used as a response to a verification scenario; (iii) the ability to determine, by machine logic, which document should be used in a verification scenario (verifying the data that is on the document in some way); and (iv) allows a verifier to request one or more documents, each of a specific type (or sub-type or sub-sub-type, etc. in a hierarchical type definition scheme), and the owner's device can automatically match which documents fulfill the verifier's request. Further with respect to item (iv) on the foregoing list, for example, a pharmacist might ask to see two forms of government picture identification and an insurance card from someone picking up a prescription. The verifier (the pharmacist) can request two documents, both of the document category "government identification", and a third document of category "medical insurance". Machine logic of some embodiments of the present invention provide for automatic (that is, without substantial human intervention) matching of an owner's documents to determine which are government issued documents, out of a set that could include a driver's license, grocery store card, gym membership, vehicle registration, passport, student id, etc. Multiple documents such as the driver's license, passport and student id have portraits of the owner, but only the driver's license and passport would act as a valid government issued document in this example.

In an embodiment of the present invention, an electronic identity document is characterized by a "type" by including a "document type" value in a file that comprises an electronic identity document machine readable metadata. Certain types of documents belong to certain categories that are represented by these document types. A given document type may represent a category of document, including but not limited to, a driver's license, fishing license, membership card, insurance card, rewards card, social security card, police badge, card for food assistance, library card, gym membership, etc. Thus, electronic identity document file includes machine readable metadata comprising the document type of the electronic identity document.

Embodiments of the present invention also include a method for an owner to fulfill a request from a verifier for identifying information by using one or more categories of documents designated with different document types. In an embodiment of the present invention, the individual identity documents may include attributes and a verification challenge may require a response including these attributes, which the program code, in an embodiment of the present invention, may ascertain from one or more identity documents retained in a memory accessible to a client computing device. In an embodiment of the present invention, a verifier can request information by specifying document categories (characterized by metadata comprising document types in the files) and attributes for each category of document necessary to validate the identity of the owner.

In an embodiment of the present invention, program code generates identity documents that each include document types, i.e., machine readable metadata indicating a category of the electronic identity document in each file representing an individual identity document. As explained below, in an embodiment of the present invention, the program code utilizes the document type of a given electronic document file to determine whether the contents of the file satisfy a given identification verification challenge. In an embodiment of the present invention, the addition of a document type to a file representing an identity document enables support for the program code to provide a deterministic match capability. To further enhance user experience, the program code may store, in a memory resource, a definition for each document type in a document definition, which can be accessed by the program code and provided to a user of a client computing node in a graphical user interface, enhancing the user experience. The definition may include plain text describing the categories of documents represented as various (metadata-based) document types. Thus, a document definition for a given document type may map a category to the document type. In an embodiment of the present invention, categories embedded or encoded as (metadata) document types in electronic identity documents include, but are not limited to: government identification, driver's license, student identification, rewards card, vehicle insurance, health insurance, membership card.

Figure 1:
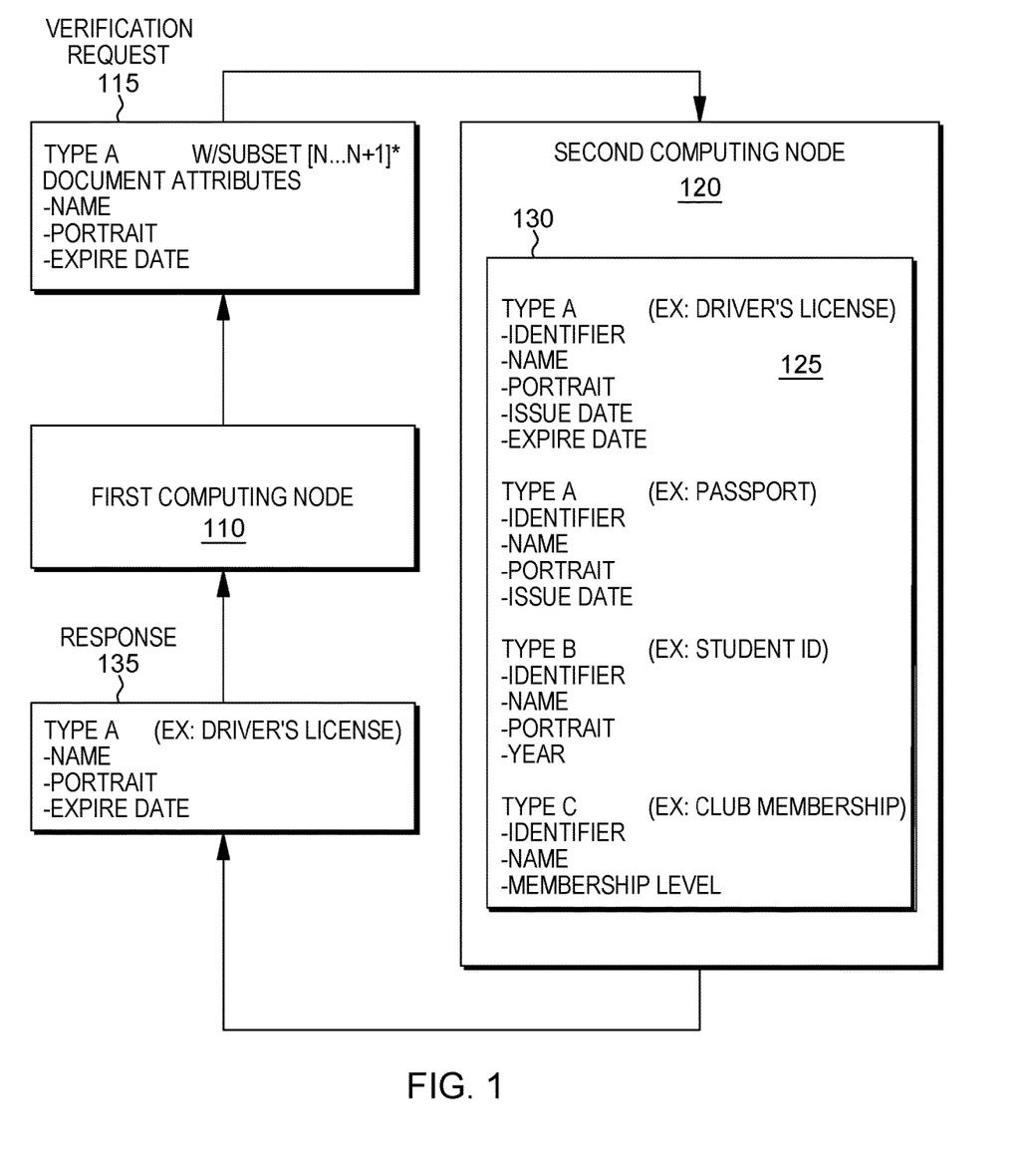
FIG. 1 is a workflow diagram depicting aspects of the present technique.
Figure 2:
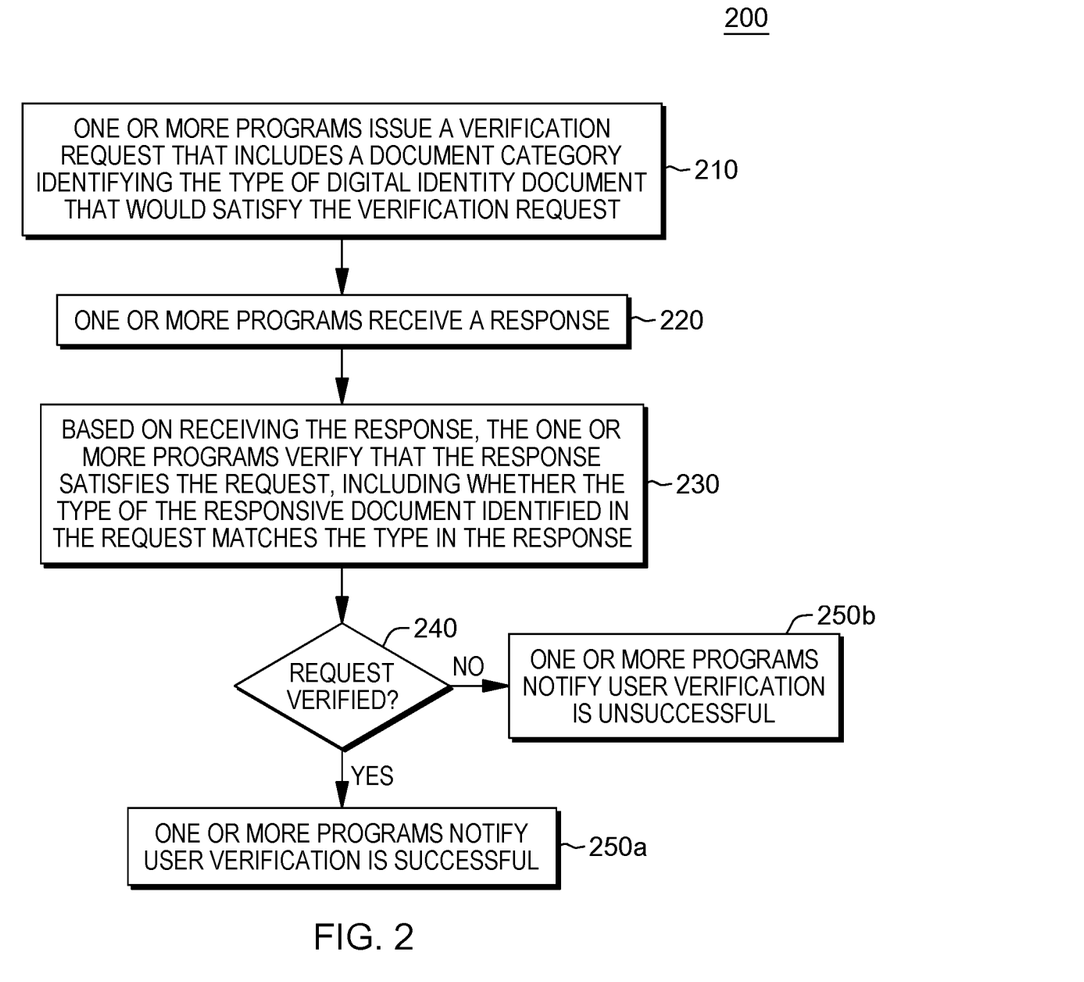
FIG. 2 illustrates certain aspects of some embodiments of the present invention.
Figure 3:
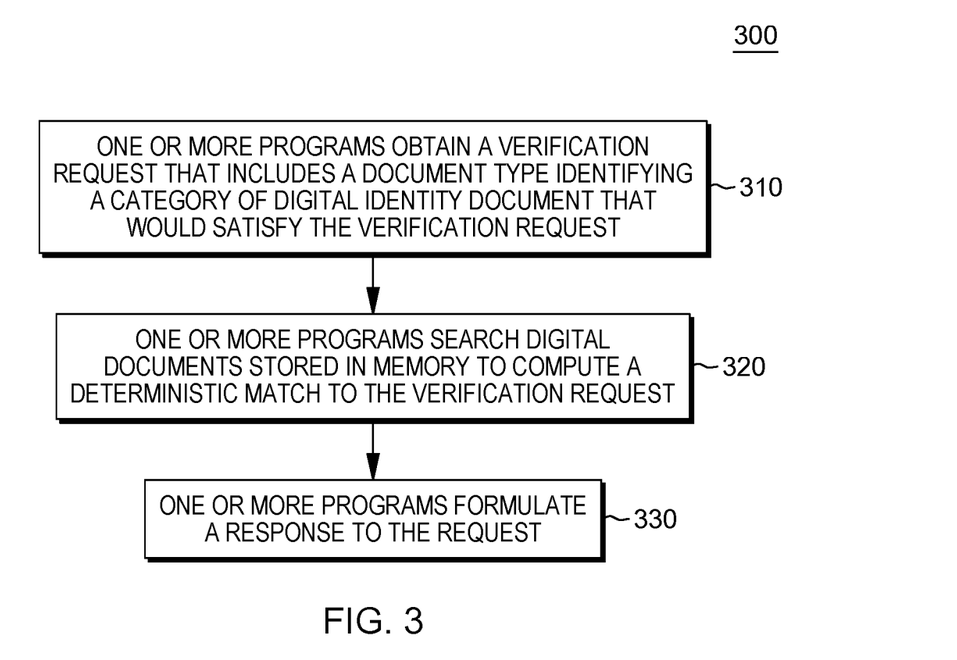
FIG. 3 illustrates certain aspects of some embodiments of the present invention.

FIG. 1 is overview that depicts various aspects of an embodiment of the present invention. FIG. 2-3 are workflows that highlight aspects of various embodiments of the present invention from the point-of-view of program code making a verification request and receiving a response, e.g., FIG. 2, and from the point of view of program code obtaining a verification request and formulating a response, e.g., FIG. 3. Aspects of FIG. 2 and FIG. 3 can be accomplished by program code executed by the same processor or a group of processors. The two points of view are merely presented for illustrative purposes.

Returning to FIG. 1, in an embodiment of the present invention, a first computing node 110 communicates a verification request 115 to a second computing node 120. As an example, program code comprising the verification request 115 may include a request for a document of a specific category, and therefor with a specific document type, to fulfill, for example, a basic proof of identity. The program code that comprises the verification request 115 may also specify certain attributes that satisfy the verification, in addition to the document type, such as, name portrait (picture of the individual being identified taken by the issuing authority), and an expiration date for the electronic identity document.

In an embodiment of the present invention, program code creates each identity document with defining attributes and a document type. The document type may represent a category of document that includes, but is not limited to, a driver's license, fishing license, membership card, insurance card, rewards card, social security card, police badge, card for food assistance, library card, and gym membership. Files that comprise the identity documents include these documents types as machine readable metadata. The document type of a file and the attributes of the file may be utilized in verifications by embodiments of the present invention. The attributes may be tagged with an ISO specified identifiers (e.g., ISO, WEDI and/or custom) which can be used to match individual attributes at a granular level. The categories of documents represented by various document types can be understood as part of an ecosystem framework for matching at a macro level in response to identification challenges.

As illustrated in FIG. 1, the program code at the second computing node 110 receives the verification request 115, and identifies which digital identity documents satisfy the verification request 115. In an embodiment of the present invention, the digital documents 125 that the program code could utilize to respond to the request are stored in a memory 130 on the second computing node 120 itself. In this embodiment, the second computing device 120 does not utilize a backend database outside of the second computing device 120 itself in order to maintain the security of the digital documents. In an embodiment of the present invention, the program code executed by one or more processors accessible to the second computing device 120 locally encrypts the identity documents that it stores, for example, using a public key specific to the second computing device 120. In an embodiment of the present invention, program code executed on the second computing device 120 stores the identity documents in an area and/or manner that is not accessible to any other applications executing on the second computing device 120 and/or otherwise utilizing resources of the second computing device 120.

In an embodiment of the present invention, a document type for a given digital document may logistically represent more than one category of digital document. In an embodiment of the present invention, each document category is in a tree hierarchy, thus, for example, a driver's license is in the branch of government identification. The document type in this case would be assigned category "driver's license" and by nature of the tree hierarchy of categories is also identifiable as a government id by the program code. By utilizing this tree hierarchy to effectively enable a document type (e.g., metadata in the electronic file comprising the electronic identity document) to encompass more than one category of identification, the program code performing a deterministic match based on a verification request can utilize a digital identification in a response that meets the criteria in a verification request, which, in turn, enables accurate verification based on the same digital document both in a scenario where verifier only needs basic proof of identity, as well as, for example, at traffic stop scenario, where a law enforcement officer needs to specifically check for a valid driver's license.

Depending upon the embodiment of the present invention, communicating a verification request 115 from the first computing node 110 to the second computing node 120 may be performed in a variety of different ways to preserve the security of the identity documents utilized to respond to the verification request 115. For example, in an embodiment of the present invention, program code executed by one or more processors accessible to the first computing node 110 may broadcast the verification request 115 and program code executed by one or more processors accessible to the second computing device 120 may obtain the verification request 115 and display the verification request 115 in a display communicatively connected to the one or more processors executing the program code. A user of the second computing node 120 may utilize the display or another input/output device of the second computing node 120 to accept the verification request 115. When the program code receives the acceptance of the user, the program code responds to the verification request 115. If the program code receives a denial of the verification request, or, for example, no response from the user after a certain amount of time has lapsed, the program code will not respond to the verification request 115 with proof of identity. In another embodiment of the present invention, the program code that receives the request for verification 115 may vet the sender and automatically respond to the verification request 115 based on ascertaining information about the sender.

As understood by one of skill in the art, when a connection is enabled between the first computing device 110 and the second computing device 120, program code originating from each device may execute on the other device as part of the verification process. Thus, although FIG. 1 depicts a request 115 from program code at the first computing device 110 and a response 135 from a second computing device 120, the method may vary insofar as the originator of the program code in accordance with various embodiments of the present invention.

Returning to FIG. 1, program code at the second computing device 120 obtains the verification request 115 and formulates a response 135 based on the verification request 115 and the digital documents 125 (stored locally, in this embodiment) in a memory 130. As illustrated in FIG. 1, more than one identify document may satisfy a given verification request 115. As aforementioned, the verification request 115 in this example requested an identity document of a given document type with name, portrait, and expiration date attributes. Program code responds to the verification request 115 by locating, in this example, more than one identity document of the digital documents 125 stored in the memory 130 that satisfy the verification request 115. In this example, both a driver's license and a passport include the requested document type, but only the driver's license include all of attributes and are associated with the category of document requested.

In an embodiment of the present invention, administrators may define the categories of document that will be represented by certain document types in electronic files representing the documents. Thus, program code performing aspects of the verification process described herein may access these pre-defined mappings. These document categories, which are mapped to document types, can be understood as levels of verification, such that multiple verification entities may use the same document in a response and be guaranteed accuracy. Including document types in digital documents establishes a level of verification that differentiates which digital documents can be used for certain verification scenarios. For example, verification scenarios that require a government issued identification document could be differentiated from those that require any non-official proof of name and photo.

In an embodiment of the present invention, associating new kinds of documents with certain categories of digital documents with given document types may require approval by an account representative, as this association will be utilized by many different entities who verify identity and should be accurate across all verification scenarios. While assigning a document type corresponding to a low-security identification document, for example to a document that can be categorized as a retail rewards card, may not require great scrutiny, associating identification from a country outside of the United States with a government-issued identification document type could require greater scrutiny. Thus, in an embodiment of the present invention a property can be defined for each document type to mark whether or not adding this document type to a new kind of digital document, requires approval. For example, adding a document type used to identify/categorize documents as government-issued identification to a new kind of document could be approved only for issuers that have been confirmed to issue government identification documents, while adding a document type used to identify/categorize membership cards for a generic business to a kind of document would not require this approval.

Returning to FIG. 1, in an embodiment of the present invention, either the owner or the program code selects a single document from the documents that satisfies the verification request 115 to be included in a response 135. In FIG. 1, only one document, the driver's license, is a direct response to the verification request 115. Thus, the program code can make the selection automatically, but if more than one document satisfied the verification request, the program code could solicit input from a user and/or could select which document to utilize in the response 135 based on pre-defined criteria.

In an embodiment of the present invention, the program code generates a response 135 based on selecting the document. By supplying only the minimum amount of information requested by the verification request 115 to satisfy the request, the program code protects the privacy of the owner of the digital documents 125. In an embodiment of the present invention, the program code may select a document from two documents that fulfill the request based on an algorithm weighting certain documents above others. As illustrated in FIG. 1, the response 135, in an embodiment of the present invention, includes the category represented by the document type and attributes.

Upon receipt of the response 135 by the first computing device 110, in an embodiment of the present invention, the program verifies that the response 135 matches the verification request 115. For example, the program code verifies that the response 135 contains a document type and attributes that the verification request 115 included. If there is an exact match between the verification request 115 and the response 135 (i.e., the attributes that were provided were from a document with the document type of the document specified in the request and the attributes were those requested), the verification transaction between the first computing device 110 and the second computing device 120 is complete, and the identity is verified. If the program code cannot verify the response 135, the identity of the owner is not verified.

There exist many situations where embodiments of the present invention may verify the identity of an individual when a human would not be able to make the verification. For example, an individual may desire to obtain a product where the law requires that the buyer be of a minimum age and the buyer must be able to present a government-issued identification in order to prove that he or she meets the minimum age requirement. This particular buyer, however, does not have a United States Government-issued identification document, but is only in possession of a government-issued identification document from his or her country of origin, for example, Denmark. This document is evidence that this individual exceeds the minimum age for purchase of the product. A clerk charged with verifying the age of product purchasers before allowing the purchase is both unfamiliar with the appearance of an identification issued by the government of Denmark and unable to comprehend the language on the identification, Danish. Thus, the clerk cannot verify the identity of the individual in order to make the sale. However, utilizing an embodiment of the present invention, this clerk would be able to accurately verify the identity of the individual and make the sale.

Utilizing an embodiment of the present invention, the clerk, for example, in possession of the first computing device 110, could broadcast a verification request 115 to a device utilized by the customer, e.g., the second computing device 120. The verification request 115 would include a document type corresponding to the government-issued identification category and an attribute of date of birth. The verification request 115 would also specify that the date of birth should be within certain parameters complying with the minimum age. The second computing device 120 would accept the request and program code would match the document type specified in the verification request 115 to a digital document with the same document type (i.e., a document in the government-issued identification category) accessible to the second computing device 120, in this case, the purchaser's government-issued identification from Denmark. The program code would search the attributes of this digital document to locate a date of birth and determine whether the date of birth is within the parameters specified in the verification request 115. The program code would issue a response 135 from the second computing device 120 to the first computing device 110 comprising the document type and the date of birth attribute. The response 135 may also include information further identifying the document that provided the source for this information, for example, that the document is a government-issued identification from Denmark.

Upon receipt of the response 135, program code will verify that the response 135 comports with the request. In embodiments of the present invention, by utilizing program code to generate a response 135 based on an initial request 115 and then verifying that the response 135 satisfies the request 115 the program code that performs the final verification serves as an added later of security. Thus, in this example, the clerk utilizes an embodiment of the present invention to verify the customer's identity and to verify that the customer is eligible to purchase the product, which was not possible without utilizing aspects of an embodiment of the present invention.

In an embodiment of the present invention, the verification request 115 may include a request for more than one category of document (i.e., electronic documents with different document types). In an embodiment of the present invention, program code requests documents matching one or more documents types in a verification request 115. For each document type requested, the verification request 115 may include one or more attributes. Program code fulfills this verification request 115 and formulates a response 135 using data from documents matching the document types specified in the verification request 135. To that end, the program code builds a response 135 from documents and attributes that have been defined with document types specified in the verification request 115. Attributes in the response 135 are associated with the category of the document (identified by the program code by document type), ensuring that identity information from a valid source is used. In an embodiment of the present invention, the response 135 may include any unfulfilled requirements of the request. The program code displays these shortcomings to a user for further manual verification. In embodiments of the present invention, matching information can be trusted to be accurate based on the specification of document types from which it is provided.

FIG. 2 is a workflow 200 that illustrates certain aspects of an embodiment of the present invention and specifically program code generating a verification request 115 (e.g., FIG. 1) and verifying a response 135 (e.g., FIG. 1). In an embodiment of the present invention, program code issues a verification request that includes a document type identifying one or more category of digital identity document that would satisfy the verification request (210). The verification request may also include at least one attribute, where the attribute is a parameter specific to the request that the program code is requesting, and the attribute is present on a digital document utilized to respond to the verification request.

Based on the request, the program code receives a response (220). In an embodiment of the present invention, the response includes an identifier of a digital document and the category or document type associated with the digital document. The response may also include one or more attributes from the document that were included in the initial request. Based on receiving the response, the program code verifies that the response satisfies the request, including whether the document type of the responsive document identified in the request matches the document type in the response (230). If the program code verifies the request, the identity verification transaction is complete (240). In an embodiment of the present invention, the program code may notify the user that the identification was successful (250a). If the program code cannot verify the identity based on the response (240), for example, the responsive document did not include the document type requested, the program code may alert an operator of the computing device making the verification that the identification was unsuccessful (250b). In another embodiment of the present invention, based on the verification failing, the program code may automatically generate a new verification request.

As discussed earlier, more than one category of document can be represented by a document type (i.e., metadata in a file comprising an electronic identity document). The use of document type to represent these categories may allow for a deterministic match to be computed in a large number of cases. For example, digital documents from two different issuers have the potential to create a verification issues at a traffic stop, e.g., the verifier request a New York State Driver's License, but the driver has a New Hampshire Driver's License. This mismatch case of two different issuers in the scenario of a traffic stop is solved by the program code requesting a document with a document type that indicates that it is a driver's license, rather than trying to match attributes and asking for a specific document based on a role, and subsequently getting a response back that is based on similar attributes, or on the requested attributes but from a digital document in a category other than requested, and is therefore not fully responsive to the request. In cases such as this driver's license challenge, a law enforcement officer will need the ability to validate an out of state license. Thus, in embodiments of the present invention, by including types, all foreseeable challenge scenarios and can be accommodated even in scenarios where issuers of digital documents are not known to the verifying authority.

In an embodiment of the present invention, as issuer would have the ability to request that its digital documents be recognized and verified in response to verification requests. Thus, issuers would request that its documents be included in a category that is represented in digital document files in the present invention by a given document type. For example, the Island of Guam may request that its new government identification be considered a driver's license and a government identification.

FIG. 3 also illustrates a workflow 300 of an embodiment of the present invention but focuses on program code formulating a response 135 (e.g., FIG. 1) to a verification request 115 (e.g., FIG. 1). In an embodiment of the present invention, program code obtains a verification request (310) that includes a document type identifying one or more category of digital identity document that would satisfy the verification request. The verification request may also include at least one attribute where the attribute is a parameter specific to the request that the program code is requesting is present on a digital document utilized to respond to the verification request. In an embodiment of the present invention, the program code may verify that the request is from a trusted source before responding to the request.

In an embodiment of the present invention, based on obtaining this request, the program code searches digital documents stored in memory to compute a deterministic match to the verification request (320). For example, the program code locates digital documents where the files contain the same document type as requested and searches the digital documents for the attributes in the documents identified as including the particular document type. In an embodiment of the present invention, based upon an algorithm, which may be included in the request, the program code selects a document for use in responding to the request.

In embodiment of the present invention, responding to a verification request may be automatic and handled by the program code, or the program code may solicit input from the user (i.e., the owner of the digital documents) before responding the verification request. For example, in an aspect of an embodiment of the present invention, the program code may display to the user in a display on a computing device a list of digital documents that are in categories that are designated utilizing the requested document type. The user can then select a document to utilize in responding to the request. In an embodiment of the present invention, the program code could offer the user the option of selecting a document outside that list as well and would guide the user into picking this applicable document immediately and easily. For example, in an embodiment of the present invention, the program code could generate a list of documents that the program code could acquire and utilize to respond to the verification challenge. This document acquisition list could be arranged by document categories. The user could scroll through this list and view which businesses have signed up as issuers and made documents available. A user may recognize a grocery store where he or she has an account and could select this issuer, prompting the program code to contact the identified issuer and download the digital identity document of the user from that issuer.

An embodiment of the present invention may also include an option for the user to enable automatic responses with guaranteed accuracy from matching document types. Embodiments of the present invention could also include an option of enabling manual controls when the program code is unable to locate a match and would interact with the user to utilize a document that is not an exact match (e.g., a document that includes the requested documents but is from a category that is not mapped to the requested document type) to attempt to meet the verification challenge of the request.

Returning to FIG. 3, in an embodiment of the present invention, the program code formulates a response to the request (330). The response may include identifying information related to the digital document selected for the response and it may also include the one or more categories of the document and the content of the one or more attribute requested in the verification request.

One or more aspects may relate to cloud computing. For example, in embodiments of the present invention, the program code can access aforementioned acquisition list that may be displayed to a user from a node of a cloud computing system and/or as the acquisition list is updated, it can be distributed over devices that connect to the cloud computing node. Additionally, in an embodiment of the present invention, issuers may utilize nodes of a cloud computing system to distribute identity documents to individual devices, enabling the devices to encrypt and store relevant documents locally. Finally, individual devices making and responding to verification challenges can utilize a cloud computing environment as a centralized source of approved issuers and categorization of documents into approved types utilized by the program code in both forming and responding to verification requests.

As illustrated in FIGS. 1-3, aspects of embodiments of the present invention include one or more processors obtaining an identity verification request, where the identity verification request includes a specification for one or more electronic identity documents including one or more requested document types to fulfill the identity verification request. Based on obtaining the request one or more processors search a repository of electronic identity documents to locate at least one electronic identity document including each of the one or more requested document types, where each electronic identity document in the repository comprises includes a document type comprised of machine readable metadata. Based on locating the at least one electronic identity document comprising each of the one or more requested document types, the one or more processors perform a deterministic match to select one electronic identity document including each of the one or more requested document types to utilize in formulating a response to the identity verification request. The one or more processors formulate a response to the identity verification request, based on the selected electronic identity documents. In an embodiment of the present invention, the one or more processor may perform the deterministic match automatically.

In an embodiment of the present invention, the respective type of each electronic identity document characterizes the electronic identity document.

In an embodiment of the present invention the respective types of each electronic identity document indicate that the document is one of: a driver's license, a fishing license, a membership card, an insurance card, a rewards card, a social security card, a police badge, a card for food assistance, a library card, or a gym membership.

In an embodiment of the present invention, the identity verification request also includes a specification for attributes of the one or more electronic identity documents of the one or more requested document types, and where performing the deterministic match includes the one or more processors verifying that data in each of the one electronic identity document including each of the one or more requested document types includes the attributes. In an embodiment of the present invention, the response includes this data from the selected electronic identity documents.

In an embodiment of the present invention, the one or more processor obtains an identity verification request that also includes a specification for attributes for each of the one or more electronic identity documents of the one or more requested document types. Thus, when the one or more processor performs a deterministic match, the one or more processors select each of the one electronic identity document including each of the one or more requested document types from more than one electronic identity document of the one or more requested document types including the attributes.

In an embodiment of the present invention, the one or more requested document types include at least one of: a sub-type or a sub-sub-type in a hierarchical type definition scheme.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 4:
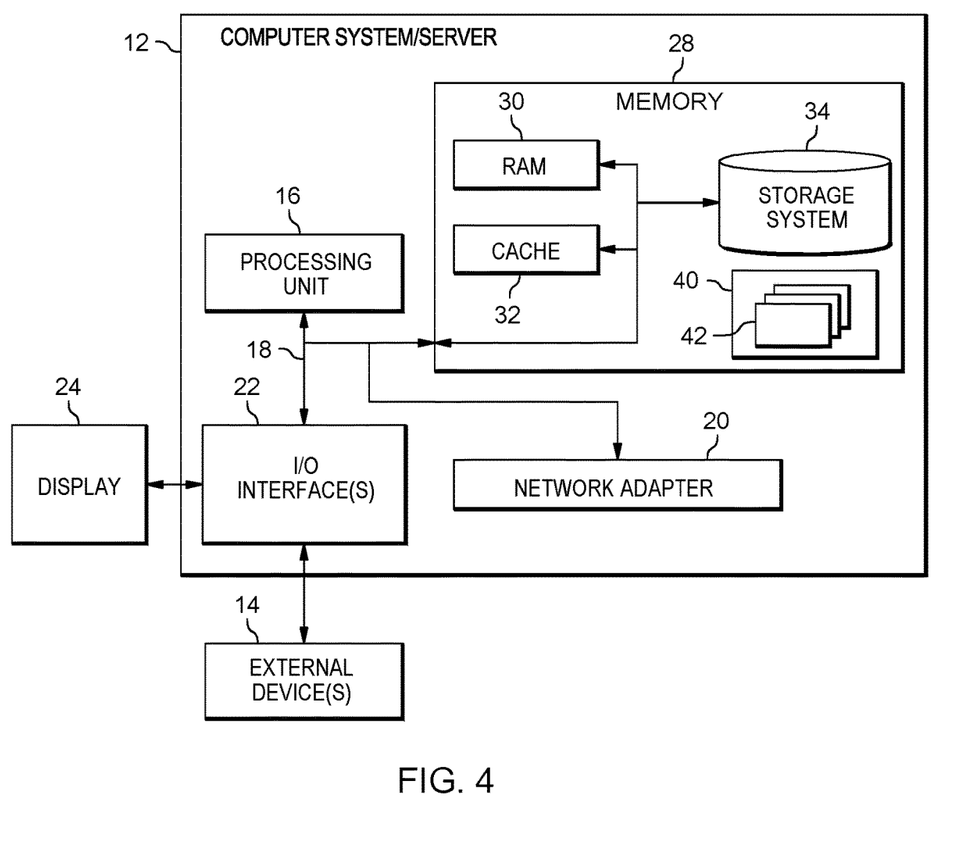
FIG. 4 depicts one embodiment of a cloud computing node.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 5:
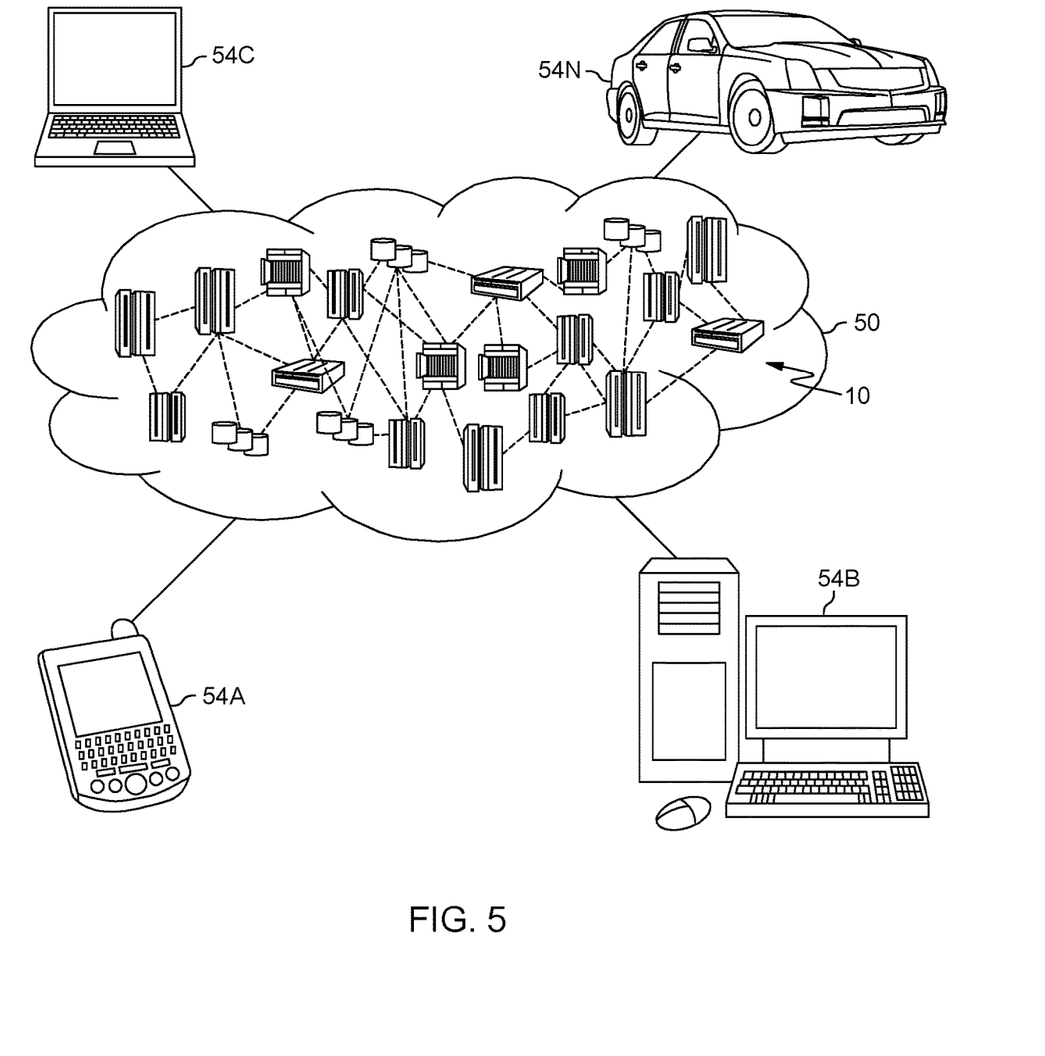
FIG. 5 depicts one embodiment of a cloud computing environment.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
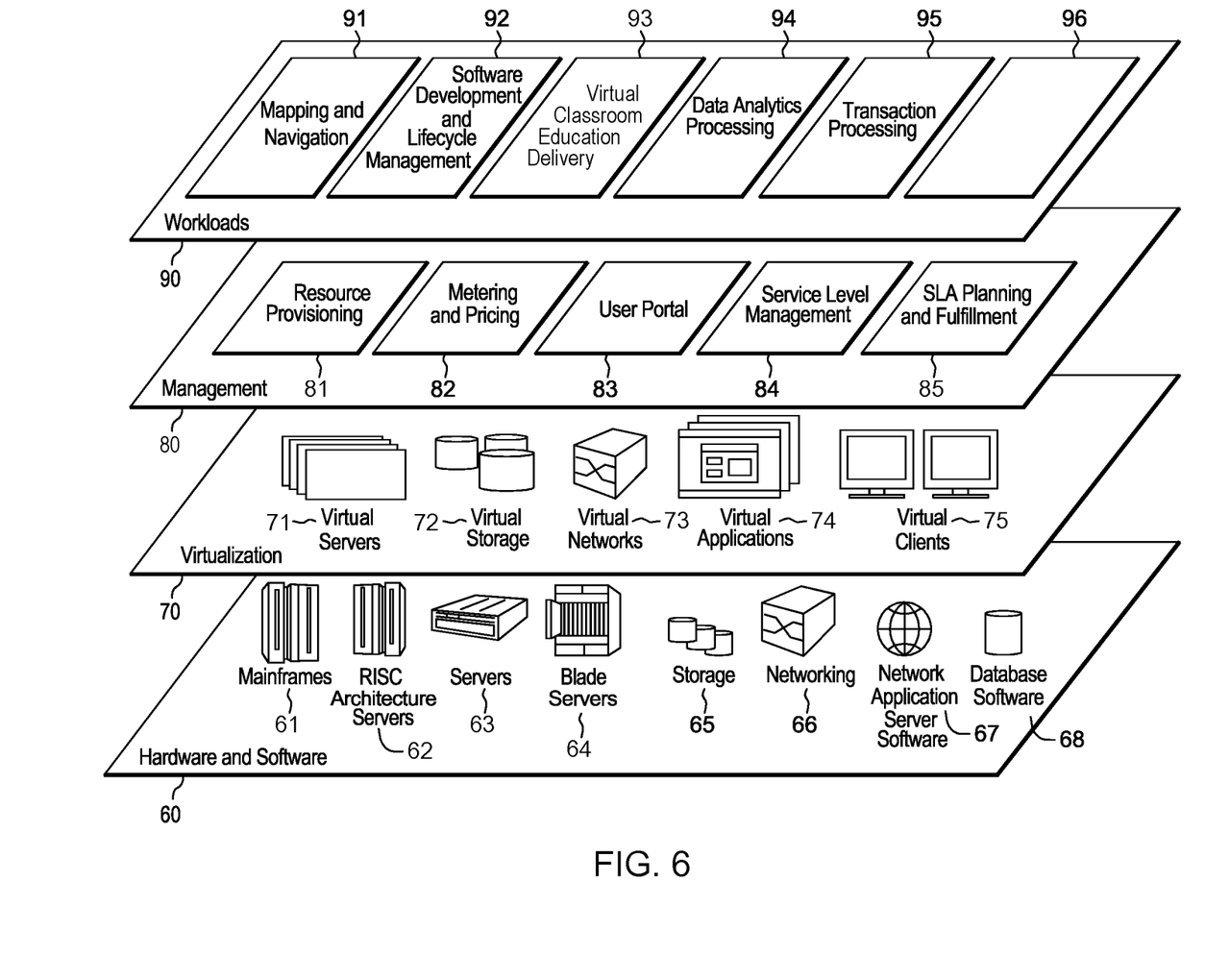
FIG. 6 depicts one example of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below, which may include maintaining VPD at a VPD location the computer system. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and synchronization of identification document categorization and approved issuers among client devices with connectivity to a cloud computing node.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    loading, by one or more processors of a computing resource, from one or more external clients, into a repository internal to the computing resource, one or more identity electronic documents, wherein the loading comprises encoding the one or more identity electronic documents with metadata indicating a document type for each document;
    locally encrypting, by the one or more processors, one or more identity electronic documents stored by the one or more processors in the repository, utilizing a public key specific to the computing resource, wherein the electronic documents stored in the repository are accessible to accepted identity verification requests obtained by the one or more processors and are not accessible to applications executing on the computing resource;
    obtaining, by the one or more processors, from a second computing resource, an identity verification request, wherein the identity verification request comprises a specification for one or more electronic identity documents comprising one or more requested document types to fulfill the identity verification request, the specification comprising a specification for attributes of the one or more electronic identity documents of the one or more requested document types;
    searching, by the one or more processors, the repository of electronic identity documents to locate at least one electronic identity document comprising each of the one or more requested document types, wherein each electronic identity document in the repository comprises machine readable metadata comprising a respective document type;
    based on locating the at least one electronic identity document comprising each of the one or more requested document types, automatically performing, by the one or more processors, a deterministic match to select one electronic identity document comprising each of the one or more requested document types to utilize in formulating a response to the identity verification request, performing the deterministic match comprising verifying, by the one or more processors, that data in each of the one electronic identity document comprising each of the one or more requested document types comprises the attributes; and
    formulating, by the one or more processors, a response to the identity verification request, based on the selected electronic identity documents.

2. The computer-implemented method of claim 1, wherein the respective type of each electronic identity document characterizes the electronic identity document.

3. The computer-implemented method of claim 2, wherein the respective types of each electronic identity document indicate that each electronic identity document is selected from the group consisting of: a driver's license, a fishing license, a membership card, an insurance card, a rewards card, a social security card, a police badge, a card for food assistance, a library card, and a gym membership.

4. The computer-implemented method of claim 1, wherein the one or more requested document type is a sub-type in a hierarchical type definition scheme.

5. The computer-implemented method of claim 1, wherein the response comprises the data from the selected electronic identity documents.

6. The computer-implemented method of claim 1, wherein the identity verification request further comprising a specification for attributes for each of the one or more electronic identity documents of the one or more requested document types.

7. The computer-implemented method of claim 6, wherein performing the deterministic match comprises selecting each of the one electronic identity document comprising each of the one or more requested document types from more than one electronic identity document of the one or more requested document types comprising the attributes.

8. The computer-implemented method of claim 1, wherein the one or more requested document type is a sub-sub-type in a hierarchical type definition scheme.

9. A computer program product comprising:
    a non-transitory computer readable storage medium readable by a processor and storing instructions which when executed by the processor performs a method comprising:
        loading, by one or more processors of a computing resource, from one or more external clients, into a repository internal to the computing resource, one or more identity electronic documents, wherein the loading comprises encoding the one or more identity electronic documents with metadata indicating a document type for each document;
        locally encrypting, by the one or more processors, one or more identity electronic documents stored by the one or more processors in the repository, utilizing a public key specific to the computing resource, wherein the electronic documents stored in the repository are accessible to accepted identity verification requests obtained by the one or more processors and are not accessible to applications executing on the computing resource;
        obtaining, by the one or more processors, from a second computing resource, an identity verification request, wherein the identity verification request comprises a specification for one or more electronic identity documents comprising one or more requested document types to fulfill the identity verification request, the specification comprising a specification for attributes of the one or more electronic identity documents of the one or more requested document types;

searching, by the one or more processors, the repository of electronic identity documents to locate at least one electronic identity document comprising each of the one or more requested document types, wherein each electronic identity document in the repository comprises machine readable metadata comprising a respective document type;

based on locating the at least one electronic identity document comprising each of the one or more requested document types, automatically performing, by the one or more processors, a deterministic match to select one electronic identity document comprising each of the one or more requested document types to utilize in formulating a response to the identity verification request, performing the deterministic match comprising verifying, by the one or more processors, that data in each of the one electronic identity document comprising each of the one or more requested document types comprises the attributes; and formulating, by the one or more processors, a response to the identity verification request, based on the selected electronic identity documents.

10. The computer program product of claim 9, wherein the respective type of each electronic identity document characterizes the electronic identity document.

11. The computer program product of claim 10, wherein the respective types of each electronic identity document indicate that each electronic identity document is selected from the group consisting of: a driver's license, a fishing license, a membership card, an insurance card, a rewards card, a social security card, a police badge, a card for food assistance, a library card, and a gym membership.

12. The computer program product of claim 9, wherein the one or more requested document type is a sub-type in a hierarchical type definition.

13. The computer program product of claim 9, wherein the response comprises the data from the selected electronic identity documents.

14. The computer program product of claim 9, wherein the identity verification request further comprising a specification for attributes for each of the one or more electronic identity documents of the one or more requested document types.

15. The computer program product of claim 14, wherein performing the deterministic match comprises selecting each of the one electronic identity document comprising each of the one or more requested document types from more than one electronic identity document of the one or more requested document types comprising the attributes.

16. The computer program product of claim 9, wherein the one or more requested document type is sub-sub-type in a hierarchical type definition scheme.

17. A system comprising:
a memory;
one or more processors of a computing resource in communication with the memory; and
program instructions when executed by the one or more processors, via the memory, perform a method, the method comprising:
loading, by the one or more processors of the computing resource, from one or more external clients, into a repository internal to the computing resource, one or more identity electronic documents, wherein the loading comprises encoding the one or more identity electronic documents with metadata indicating a document type for each document;

locally encrypting, by the one or more processors, one or more identity electronic documents stored by the one or more processors in the repository, utilizing a public key specific to the computing resource, wherein the electronic documents stored in the repository are accessible to accepted identity verification requests obtained by the one or more processors and are not accessible to applications executing on the computing resource;

obtaining, by the one or more processors, from a second computing resource, an identity verification request, wherein the identity verification request comprises a specification for one or more electronic identity documents comprising one or more requested document types to fulfill the identity verification request, the specification comprising a specification for attributes of the one or more electronic identity documents of the one or more requested document types;

searching, by the one or more processors, the repository of electronic identity documents to locate at least one electronic identity document comprising each of the one or more requested document types, wherein each electronic identity document in the repository comprises machine readable metadata comprising a respective document type;

based on locating the at least one electronic identity document comprising each of the one or more requested document types, automatically performing, by the one or more processors, a deterministic match to select one electronic identity document comprising each of the one or more requested document types to utilize in formulating a response to the identity verification request, performing the deterministic match comprising verifying, by the one or more processors, that data in each of the one electronic identity document comprising each of the one or more requested document types comprises the attributes; and formulating, by the one or more processors, a response to the identity verification request, based on the selected electronic identity documents.

18. The system of claim 17, wherein the respective type of each electronic identity document characterizes the electronic identity document.

19. The system of claim 18, wherein the respective types of each electronic identity document indicate that each electronic identity document comprises one of: a driver's license, a fishing license, a membership card, an insurance card, a rewards card, a social security card, a police badge, a card for food assistance, a library card, or a gym membership.

20. The system of claim 18, wherein the identity verification request further comprising a specification for attributes for each of the one or more electronic identity documents of the one or more requested document types, and wherein performing the deterministic match comprises selecting each of the one electronic identity document comprising each of the one or more requested document types from more than one electronic identity document of the one or more requested document types comprising the attributes.

* * * * *